US011426973B2

(12) United States Patent
Ramaswamy

(10) Patent No.: US 11,426,973 B2
(45) Date of Patent: Aug. 30, 2022

(54) HIGH TEMPERATURE HOSE

(71) Applicant: Parker-Hannifin Corporation, Cleveland, OH (US)

(72) Inventor: Nagarajan Ramaswamy, Fort Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 5 days.

(21) Appl. No.: 17/073,538

(22) Filed: Oct. 19, 2020

(65) Prior Publication Data

US 2021/0221098 A1 Jul. 22, 2021

Related U.S. Application Data

(60) Provisional application No. 63/006,787, filed on Apr. 8, 2020, provisional application No. 62/963,567, filed on Jan. 21, 2020.

(51) Int. Cl.
*B32B 7/027* (2019.01)
*B32B 1/08* (2006.01)
*B32B 5/02* (2006.01)
*B32B 15/02* (2006.01)
*B32B 15/18* (2006.01)
*B32B 27/34* (2006.01)

(52) U.S. Cl.
CPC ............. *B32B 7/027* (2019.01); *B32B 1/08* (2013.01); *B32B 5/024* (2013.01); *B32B 15/02* (2013.01); *B32B 15/18* (2013.01); *B32B 27/34* (2013.01); *B32B 2307/304* (2013.01); *B32B 2597/00* (2013.01)

(58) Field of Classification Search
CPC ..... B32B 7/027; B32B 2307/304; B32B 1/08; B32B 5/024; B32B 15/18; B32B 2597/00
See application file for complete search history.

(56) References Cited

U.S. PATENT DOCUMENTS

| 8,127,800 | B2 | 3/2012 | Ramaswamy et al. |
| 8,176,943 | B2 | 5/2012 | Stroempl et al. |
| 8,689,838 | B2 | 4/2014 | Stroempl et al. |
| 10,207,455 | B2 | 2/2019 | Kan et al. |
| 2003/0207103 | A1* | 11/2003 | Zvosec ..................... B32B 5/16 428/329 |
| 2005/0081381 | A1* | 4/2005 | Ingram ................... F16L 33/26 29/890.144 |
| 2010/0224277 | A1* | 9/2010 | Witz ..................... F16L 59/141 138/149 |

(Continued)

FOREIGN PATENT DOCUMENTS

| CN | 206217255 U | 11/2017 |
| CN | 108443602 | 8/2018 |
| EP | 3 429 840 | 1/2019 |

OTHER PUBLICATIONS

Extended European Search Report prepared by the European Patent Office in application No. EP 20 21 5359.9 dated Jun. 9, 2021.

Primary Examiner — Craig M Schneider
Assistant Examiner — David R Deal
(74) Attorney, Agent, or Firm — McDonnell Boehnen Hulbert & Berghoff LLP

(57) ABSTRACT

An example hose comprises: a core tube; a reinforcement layer surrounding the core tube and comprising basalt fiber; and a thermal insulation layer surrounding the reinforcement layer and comprising basalt fiber and/or carbon fiber.

20 Claims, 6 Drawing Sheets

(56) References Cited

U.S. PATENT DOCUMENTS

| | | | | |
|---|---|---|---|---|
| 2010/0300570 A1* | 12/2010 | Witz | ............................ | F16L 9/12 |
| | | | | 138/137 |
| 2013/0269819 A1* | 10/2013 | Ruby | ...................... | F16L 58/04 |
| | | | | 138/141 |
| 2014/0216591 A1* | 8/2014 | Witz | ........................ | F16L 11/16 |
| | | | | 138/129 |
| 2015/0034341 A1* | 2/2015 | Pigeon | .................... | B05B 1/267 |
| | | | | 169/54 |
| 2015/0260328 A1* | 9/2015 | Colcombet | .............. | D04C 1/12 |
| | | | | 138/125 |
| 2015/0276094 A1* | 10/2015 | Chang | ................. | B29C 65/1403 |
| | | | | 138/140 |
| 2015/0292651 A1* | 10/2015 | Moreau | ................... | B32B 37/24 |
| | | | | 138/125 |
| 2016/0003382 A1* | 1/2016 | Glejbol | .................. | F16L 11/20 |
| | | | | 138/134 |
| 2019/0078708 A1* | 3/2019 | Hudson | ................... | B32B 27/32 |
| 2019/0247685 A1 | 8/2019 | Kolte et al. | | |

* cited by examiner

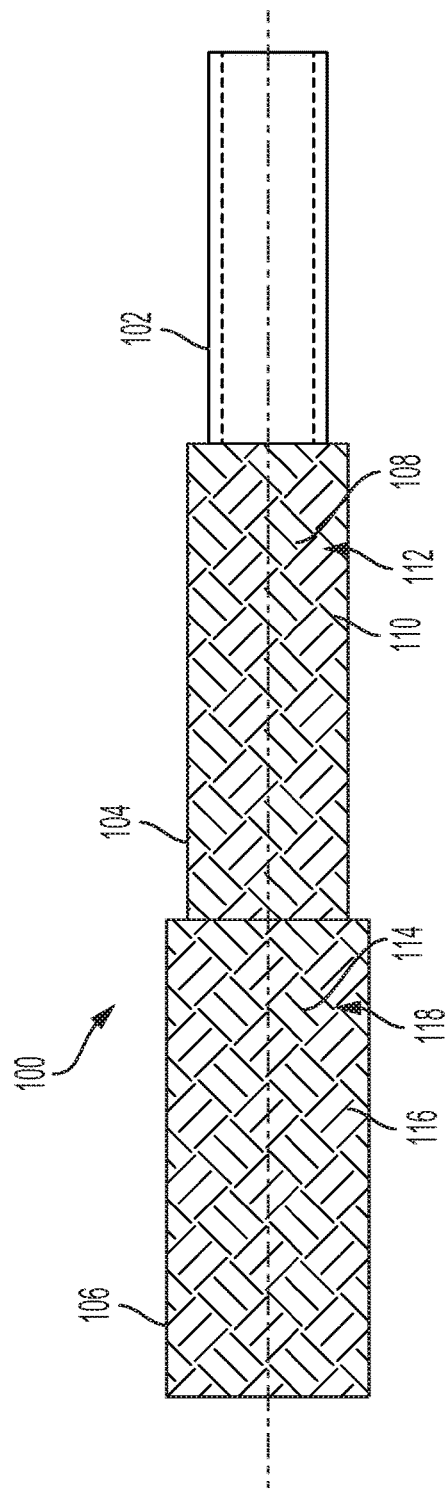
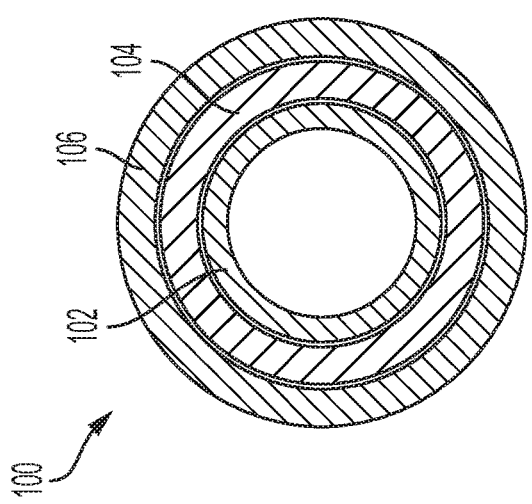

HIGH TEMPERATURE HOSE

CROSS REFERENCE TO RELATED APPLICATION

The present application claims priority to U.S. Provisional patent application No. 62/963,567 filed on Jan. 21, 2020, and entitled "High Temperature Hose," and claims priority to U.S. Provisional patent application No. 63/006,787 filed on Apr. 8, 2020, and entitled "High Temperature Hose," the entire contents of all of which are herein incorporated by reference as if fully set forth in this description.

BACKGROUND

Flexible hydraulic and pneumatic hose assemblies have been used in a variety of fluid transfer applications including, for example, in aircraft engines. Hose assemblies for various applications are designed to sustain high pressures over relatively long periods of time. It is also desirable for such hoses to have good abrasion resistance, good mechanical strength, low permeability to moisture and/or vapors, good strength to weight ratio, good corrosion resistance, suitable flexibility, etc.

In some environments, such as in aircraft or aerospace applications, hoses may be subjected to high temperatures. For example, hoses may be utilized in areas where there may be a danger of fire. Thus, a hose assembly may require fire-resistant protection to withstand the high temperatures encountered in a fire to minimize the likelihood of fire or high temperatures damaging the hose. The Federal Aviation Administration (FAA) standards require certain devices to withstand the heat of a burning aircraft for a period of fifteen minutes before exposing the enclosed devices to fire. For example, a fuel hose is required to not release fuel into a fire for the initial fifteen minutes of burning.

In examples, a hose and portions of the associated hose fittings can be encompassed with a fireguard or fire sleeve for protection. The fire sleeve can include a silicone rubber tube surrounding the hose and/or fitting. Silicon rubber fire sleeves, however, may ablate when subjected to fire. Silicon rubber fire sleeves also might not protect the hose from effects of oil, fuel, or chemicals, and further might not provide resistance to chafing. In some instances, a metal tube can be provided as an outer layer of a fire sleeve surrounding an insulating layer such as a silicone layer. However, at temperatures above 450° F., such protective covers may provide suitable protection for only a relatively short period of time. In particular, silicon rubber fire sleeves tend to dry, shrink, and crack when exposed to extremely high temperatures for extended periods of time, and may fail at around 14,000 hours.

The ability of a hose to withstand high temperatures for a given period of time may also be affected by the fluid flow through the hose. Maintaining a fluid flow through the hose may be desirable to keep the underlying hose cool during a fire. The fluids being transferred through the hose, however, can be flammable in some applications. Thus, a hose failure may result in flammable fluids coming in contact with the fire, which may feed or intensify the fire. Consequently, there has been a trend in the aircraft industry to build engines in which the flow through hoses may be reduced or stopped in the event of a fire.

It may thus be desirable for the hose to be able to withstand high temperature to resist fire for extended periods of time, and it may also be desirable for the hose to be temperature- and fire-resistant without cooling effect of fluid flowing therethrough. It is with respect to these and other considerations that the disclosure made herein is presented.

SUMMARY

The present disclosure describes implementations that relate to a high temperature hose.

In a first example implementation, the present disclosure describes a hose. The hose comprises: a core tube; a reinforcement layer surrounding the core tube and comprising basalt fiber; and a thermal insulation layer surrounding the reinforcement layer and comprising basalt fiber.

In a second example implementation, the present disclosure describes a hose assembly. The hose assembly comprises: a core tube; a reinforcement layer surrounding the core tube and comprising basalt fiber; a thermal insulation layer surrounding the reinforcement layer and comprising basalt fiber and/or carbon fiber; a fluid barrier layer surrounding the thermal insulation layer; a cover layer surrounding the fluid barrier layer; and a hose fitting coupled to an end of the core tube, wherein the hose fitting comprises: (i) a nipple positioned partially within the core tube, and (ii) a sleeve disposed about an exterior peripheral surface of the cover layer.

In a third example implementation, the present disclosure describes a method. The method includes: forming a core tube of a hose; forming a reinforcement layer about the core tube, wherein the reinforcement layer comprises basalt fiber; and applying a thermal insulation layer comprising basalt fiber about the reinforcement layer.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 1 illustrates a side-elevational view of a hose, in accordance with an example implementation.

FIG. 2 illustrates a cross-sectional front view of the hose shown in FIG. 1, in accordance with an example implementation.

DETAILED DESCRIPTION

Figure 3:
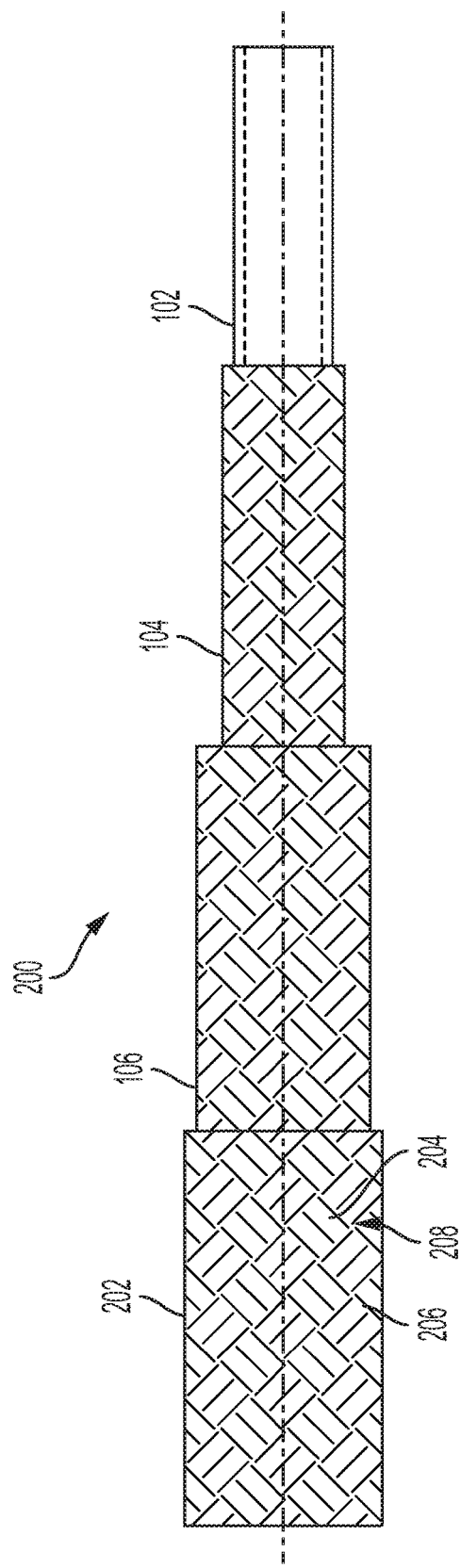
FIG. 3 illustrates a side-elevational view of a hose having a cover layer, in accordance with an example implementation.

Within examples, a hose in accordance with the present disclosure can be used in a variety of hydraulic or other fluid transfer applications. As an example, a hose disclosed herein can be used in aircraft including high performance aircraft. The hose and hose assemblies described herein can be capable of operating at elevated temperatures, such as about 2000° F. An example hose comprises a core tube, a reinforcement layer, and a thermal insulation layer comprising basalt fiber.

FIG. 1 illustrates a side-elevational view of a hose 100, and FIG. 2 illustrates a cross-sectional front view of the hose 100, in accordance with an example implementation. FIGS. 1-2 are described together.

The hose 100 includes a core tube 102, a reinforcement layer 104 surrounding the core tube 102, and a thermal insulation layer 106 surrounding the reinforcement layer 104. The core tube 102 can be provided as extruded or molded, for example. The core tube 102 can be formed from any suitable material as desired for a particular purpose or intended use. For example, for hoses used in aircraft, the core tube 102 can be made from a natural rubber, a synthetic rubber compound, a plastic, or other polymeric material.

As a particular example, the core tube 102 can be made of Polytetrafluoroethylene (PTFE), which comprises a synthetic fluoropolymer of tetrafluoroethylene. PTFE is hydrophobic, non-wetting, high density and resistant to high temperatures, and has non-stick properties. An example PTFE material is Teflon®.

Other example materials can include copolymers and blends, mixtures, alloys, or other combinations thereof, polyesters, polyvinyl chlorides, polyimides, polyurethanes, poly(ether ether ketone), polyetherimides, polybutylene and polyethylene terephthalates, polysulfones, polyacrylics, polymethylacrylates, polymethylmethacrylates, polycarbonates, poly(ester and ether urethanes), liquid crystal polymers (LCP), acetal homo and copolymers, polyolefins such as high density or molecular weight polyethylene and polyamides such as Nylon 12, and fluoropolymers. Selecting the type of material for the core tube 102 can be based on (i) whether the application is a high or low temperature resistance, (ii) surface characteristics such as coefficient of friction, (iii) physical or mechanical properties such as flexural modulus, and (iv) chemical compatibility with the fluid being transferred through the hose 100.

For aerospace applications or other applications where it may be desirable for the core tube 102 to be chemically-resistant, the core tube 102 can comprise a fluoropolymer material. Representative fluoropolymers include, but are not limited to, PTFE, fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetrafluoroethylene (ETFE) terpolymer, polyvinylidene fluoride (PVDF), polyvinylfluoride (PVF), and copolymers and blends and other combination thereof. As used herein, "chemical resistance" indicate the ability to resist swelling, crazing, stress cracking, corrosion, and/or otherwise to withstand mild acidic or alkaline solutions, phosphate-ester Solutions, alcohols and other organic solvents and hydrocarbons, inorganic solvents (such as water or brine), and the like.

In examples, the material forming the core tube 102 can comprise a homo or copolymer, or a combination thereof such as a blend of one or more homopolymers, one or more copolymers, or one or more homopolymers and one or more copolymers. Such materials each additionally can be admixed with other resins, which may be thermoplastic or thermosetting, to form an alloy, blend, mixture, or other combination, or a copolymer thereof.

In other examples, the core tube 102 can comprise a resin, which is a thermoplastic, i.e., melt-processable, synthetic rubber such as a chlorosulfonate, polybutadiene, butyl, neoprene, nitrile, polyisoprene, or buna-N, a copolymer rubber such as ethylene-propylene (EPR), ethylene-propylene-diene monomer (EPDM), nitrile-butadiene (NBR) or styrene-butadiene (SBR), or a blend such as ethylene or propylene-EPDM, EPR, or NBR, or a copolymer or blend of any of the foregoing. The term "synthetic rubbers" is used herein to encompass materials, which alternatively may be classified broadly as thermoplastic elastomers such as polyurethanes, silicones, fluorosilicones, styrene-isoprene-styrene (SIS), and styrene butadiene-styrene (SBS), as well as other polymers that exhibit rubber-like properties such as plasticized nylons, polyesters, ethylene vinyl acetates, and polyvinyl chlorides.

The material forming core tube 102 can be compounded with one or more other fillers, and/or with modifiers or other additives. Such additives, which may be active or inert, can be provided to be in liquid, powder, particulate, flake, fiber, or other form, and may include other electrically-conductive fillers, microwave-attenuating fillers, thermally-conductive fillers, lubricants such as molybdenum disulfide (MOS), wetting agents, surfactants, stabilizers, antioxidants, dispersants, pigments, dyes, and other colorants, colorings, or opacifying agents such as for coloring-coding of the tubing, luminescents, light reflectants, anti-static agents, coupling agents such as titanates, chain extending oils, tackifiers, flow modifiers, blowing agents, foaming or anti-foaming agents, reinforcements such as glass, carbon, or textile fibers, silanes, peroxides, film-reinforcing polymers and other agents, emulsifiers, thickeners, and/or flame retardants and other fillers such as aluminum trihydrate, antimony trioxide, metal oxides and salts, intercalated graphite particles, phosphate esters, decabromodiphenyl oxide, borates, siloxanes, phosphates, halogenated compounds, glass, silica, which may be fumed or crystalline, silicates, mica, ceramics, and glass or polymeric microspheres. The additives can be blended or otherwise admixed with the base material, and can comprise between about 0.05% and 80% or more by total volume of the formulation of the core tube 102.

For aerospace applications involving fuel transfer, it may be desirable for the core tube 102 to be electrically-conductive to provide static dissipation and/or electrical grounding. The core tube 102 can thus be made of a resin filled with a carbon black or other electrically-conductive filler. As admixed with the carbon black, the resin generally can form a binder into which the carbon black filler can be dispersed. The carbon black filler can be included within the resin in a proportion sufficient to provide the level of electrical conductivity desired for the intended application. In some applications, a conductivity of 12 muA@1000 VDC for the core tube 102 may be specified as in accordance with SAE Standard AS2078.

The size and dimensions of the core tube 102, including the inner and outer diameter of the core tube 102, can be selected as desired for a particular purpose or intended use.

The reinforcement layer 104 can be disposed about the core tube 102 to provide structural support as well as corrosion resistance. As used herein, the term "reinforcement layer" indicates one more reinforcement layers, and is not limited to a single layer.

The reinforcement layer 104 can be provided, for example, as knitted, braided, woven, spiral, i.e., helically, or otherwise wound, and/or wrapped or otherwise formed to surround the core tube 102. The reinforcement layer 104 can comprise a plurality of layers, where the thickness and/or number of reinforcement layers can be selected based on the desired mechanical properties, including a desired level of flexibility.

Each layer of the reinforcement layer 104 can have one or more filaments, which may be monofilaments, continuous multi-filament, i.e., yarn, stranded, cord, roving, thread, braid, tape, or ply, or short "staple" strands, of one or more fiber materials. The fiber material, which can be the same or different in each of the reinforcement layers, and which may be a blend, alloy, or other combination of two or more different materials in each layer, can be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend or other combination thereof.

In an example, the reinforcement layer 104, can comprise a metal wire such as a steel, carbon steel, which may be galvanized or corrosion resistant stainless steel (CRES), aluminum, nickel, copper, brass, brass plated steel, zinc or zinc-plated, or a blend, alloy, or other combination thereof.

As depicted in FIG. 1, the reinforcement layer 104 can be formed as a braid of fibers 108, 110 configured as alternating interwoven fibers. In an example braided configuration, the braid can be a one over, one under configuration, a two over, two under configuration, or any other configuration. In an example, the fibers 108, 110 can have interstices or gaps, such as gap 112 between adjacent fibers. In other examples, instead of a braid, the fibers of the reinforcement layer 104 can be spirally-wound or otherwise laid over the core tube 102.

The thermal insulation layer 106 is configured to surround the reinforcement layer 104 and the core tube 102 for thermally-insulating or otherwise protecting the core tube 102 in the event of a fire. As such, the thermal insulation layer 106 can assist in maintaining the core tube 102 at temperature below the combustion temperature thereof. As used herein, the term "thermal insulation layer" indicates one more thermal insulation layers, and is not limited to a single layer.

The thermal insulation layer 106 can include plurality of layers provided in the form of a tape or other film. The plurality of layers of the thermal insulation layer 106 can be braided, spiral, i.e., helically-wrapped in an overlapping manner over the outer surface of the reinforcement layer 104. The thermal insulation layer 106 can alternatively be longitudinally, i.e., "cigarette," wrapped over the reinforcement layer 104, or cross-head, co-extruded, or otherwise conventionally extruded over the reinforcement layer 104.

In an example implementation, the thermal insulation layer 106 comprises basalt fiber (e.g., one or more basalt fiber layers). In another example implementation, the thermal insulation layer comprises carbon fiber (e.g., one or more carbon fiber layers). In another example implementation, the thermal insulation layer 106 can be made of a combination of basalt fiber layer(s) and carbon fiber layer(s).

As an example, the thermal insulation layer 106 can comprise a plurality of layers where (i) a first subset of the plurality of layers comprise one, two or more basalt fiber layers and/or (ii) a second subset of the plurality of layers comprise one, two, or more carbon fiber layers. The basalt fiber and/or carbon fiber layers represent separate layers surrounding each other as opposed to basalt being mixed with carbon fiber. As such, the term "basalt fiber and/or carbon fiber" encompasses using one or more layers of basalt fiber alone, one or more layers of carbon fiber alone, or some layers of basalt fiber and some layers of carbon fiber.

Basalt is a dark-colored, fine-grained, igneous rock composed mainly of plagioclase and pyroxene minerals. Basalt can form as an extrusive rock, such as a lava flow, but can also form in small intrusive bodies, such as an igneous dike or a thin sill. It has a composition similar to gabbro. Basalt can form when lava reaches the Earth's surface at a volcano or mid ocean ridge. The lava is between 1100 to 1250° C. when it gets to the surface. Lave then cools quickly, within a few days or a couple weeks, forming solid rock. As such, basalt rock is characterized in being hard stone. Weather can lead to a yellow-brown color; however, basalt may also be found in various shades because of geochemical processes.

Basalt fiber used in the thermal insulation layer 106 can be extruded from basalt rock through a melting process without the application of additives. Basalt fibers are cost-effective and possess several advantageous properties, such as sound and thermal insulation, non-flammability, and high mechanical strength.

Carbon fibers (which can also be referred to as graphite fiber) are fibers that are about 5-10 micrometres in diameter and composed mostly of carbon atoms. Carbon fibers have several advantages including high stiffness, high tensile strength, low weight, high chemical resistance, high temperature tolerance, and low thermal expansion. To form carbon fibers, carbon atoms are bonded together in crystals that are can be aligned parallel to the long axis of the fiber as the crystal alignment gives the fiber high strength-to-volume ratio. Several thousand carbon fibers can be bundled together to form a tow (a coarse, broken fiber), which can be used by itself or woven into a fabric.

In examples, carbon fibers can be combined with other materials to form a composite. When impregnated with a plastic resin and then baked, a carbon fiber reinforced polymer is formed, which has a high strength-to-weight ratio, and is rigid. Carbon fibers can also be composited with other materials, such as graphite, to form reinforced carbon-carbon composites, which can have high heat and temperature tolerance.

In an example implementation, the reinforcement layer 104 can also be made of basalt fiber and/or carbon fiber layers as defined above. As such, both the reinforcement layer 104 and the thermal insulation layer 106 can each be made of basalt fiber and/or carbon fiber layers.

Basalt fiber can provide several performance advantages for the reinforcement layer 104 and the thermal insulation layer 106. Basalt fiber has high corrosion resistance, high abrasion resistance, shock resistance, and fatigue resistance. Basalt fiber further provides enhanced strength (e.g., higher tensile strength) and enhanced chemical resistance compared to traditional material such as fiberglass or other silica fiber based materials.

Basalt fiber can provide inherent fire resistance. Particularly, Basalt fiber does not burn at a high temperature. During fire exposure, basalt fiber remains undamaged and tied together. Further, it substantially maintains its shape and mechanical properties under high temperatures, and can thus provide protection against fire. For example, basalt fiber breakage strength is 85% of its maximum breakage strength under 752° F. and 80% under 1112° F. Also, during fire exposure, basalt fiber does not release harmful or dangerous substance into atmosphere.

Further, basalt fiber can retain performance at cold temperature and does not degrade under ultra-violet or electromagnetic radiation. Basalt fiber is also environment-friendly and safe for humans interacting with it. For instance, basalt fiber can have filament thickness that is far above human respiratory limit. It is recyclable as it is made of a natural material. It can also be disposed of via incineration without causing contamination, in contrast to silica fiber.

The degree of fire resistance and high temperature protection provided in the hose 100 by the thermal insulation layer 106 can generally be proportional to the thicknesses of the thermal insulation layer 106. The thickness of the thermal insulation layer 106 can also depend on the diameter of the core tube 102. For example, layers of thermal insulation layer 106 can each have a thickness of between about 50-150 mils (1.27-3.81 mm). However, thicker layers or multiple thinner layers can be provided in the construction to increase the fire resistance thereof. Flame resistance performances (such as per SAE Standard AS1055) for a period of 15 minutes or longer at temperatures of about 2000° F. can be achieved with one or more layers of the thermal insulation layer 106 that amount to a thickness of at least 0.05. A thicker layer can be used to elongate the time or period of fire resistance at 2000° F.

As such, the thickness of the thermal insulation layer 106 can be selected as desired to provide a desired level of thermal insulation to the core tube 102. The thickness can be selected such that the temperature of the outer surface of the core tube 102 does not exceed a desired threshold limit over a given period of time. Further, the number of layers comprised in the thermal insulation layer 106 can be selected as desired to provide a particular level of thermal insulation as well as maintain other desirable properties for the hose 100 including, for example, a desired level of flexibility.

As such, the thermal insulation layer 106 is non-ablative (i.e., does not ablate) when subjected to fire and temperatures of up to 2000° F. The term "ablate" is used here to indicate removal of material from or erosion of the material of the thermal insulation layer 106 by melting, evaporation, chipping, frictional action, etc.

As depicted in FIG. 1, the thermal insulation layer 106 can be formed as a braid of fibers 114, 116 configured as alternating interwoven fibers. In an example braided configuration, the braid can be a one over, one under configuration, a two over, two under configuration, or any other configuration. In an example, the fibers 114, 116 can have interstices or gaps, such as gap 118 between adjacent fibers. In other examples, instead of a braid, the fibers of the thermal insulation layer 106 can be spirally-wound or otherwise laid over the reinforcement layer 104.

In other example implementations, the hose can include additional layers. For instance, a jacket or a cover layer configured as a sheath or sleeve that is corrosion-resistant and anti-abrasion can be added about the thermal insulation layer 106 to protect the hose.

Figure 4:
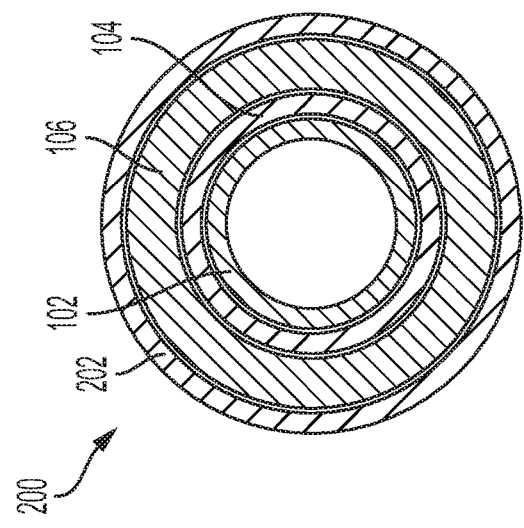
FIG. 4 illustrates a cross-sectional front view of the hose shown in FIG. 3, in accordance with an example implementation.

FIG. 3 illustrates a side-elevational view of a hose 200 having a cover layer 202, and FIG. 4 illustrates a cross-sectional front view of the hose 200, in accordance with an example implementation. FIGS. 3-4 are described together.

Similar to the hose 100, the hose 200 also includes the core tube 102, the reinforcement layer 104, and the thermal insulation layer 106 described above. Additionally, the hose 200 includes the cover layer 202 surrounding the thermal insulation layer 106 such that the cover layer is an outermost layer of the hose 200.

The cover layer 202 is configured to provide abrasion, scuff, and/or impact resistance and protects the underlying structure (e.g., other layers of) of the hose 200. The cover layer 202 also provides resistance against chafing, e.g., wear of the hose 200 due to rubbing against metallic surfaces or edges, for example. As such, the cover layer 202 is characterized as being anti-chafing. Further, dimensions (e.g., thickness) of the cover layer 202 can be selected to allow the hose 200 to have a desired level of flexibility.

Similar to the reinforcement layer 104, the cover layer 202 can be configured as a fiber braid having alternately interwoven fibers 204, 206 wound in opposite directions in an over and under pattern. Even though the braid may be relatively tight, small interstices or gaps 208 can be formed at the intersection of adjacent fibers. The fiber braid may have any configuration as desired including, for example, a one over, one under configuration, a two over, two under configuration.

The cover layer 202 can be made of a corrosion resistant material such as, for example, a stainless steel (e.g., CRES) wire or a nickel alloy wire. The cover layer 202 can be made from temperature-stabilized materials depending on the anticipated ambient temperatures for the particular application. For example, the cover layer 202 can be configured such that its corrosion resistant material can withstand temperatures of up to about 450° F.

Stabilized steels are steels containing stabilizers, such as titanium and niobium, which form carbides that are more stable than chromium carbides. Un-stabilized steels on the other hand can form chromium carbides at elevated temperatures, which can cause the material to weaken or corrode. In an example, the cover layer 202 can comprise a material that is resistant to chromium carbide formation when the ambient temperature around the cover layer 202 is about 600° F. or higher.

Other example corrosion resistant materials that can be used for the cover layer 202 include, but are not limited to, nickel based alloys such as those sold under the tradename Inconel®. The cover layer 202 can also be formed from corrosion-resistant stainless steels (CRES) including, but not limited to, type 304, type 321, and type 347 stainless steels depending on the ambient temperature levels predicted for the application.

Type 321 and type 347 are stabilized stainless steels and are suitable for high temperature applications and may be resistant to chromium carbide formation at temperatures of about 800° F. or higher. In an example, the cover layer 202 comprises a wire braid formed from a type 321 stainless steel, a type 347 stainless steel, or combinations thereof, and is resistant to chromium carbide formation at temperatures of at least about 860° F.

In another example implementation, the hose can include additional layers. For instance, a fluid barrier layer can be interposed between the thermal insulating layer 106 and the cover layer 202. Such fluid barrier layer can preclude or reduce the likelihood of fluid leakage to an outside environment of the hose and can also be configured to operate as a chemically-resistant layer.

Figure 5:
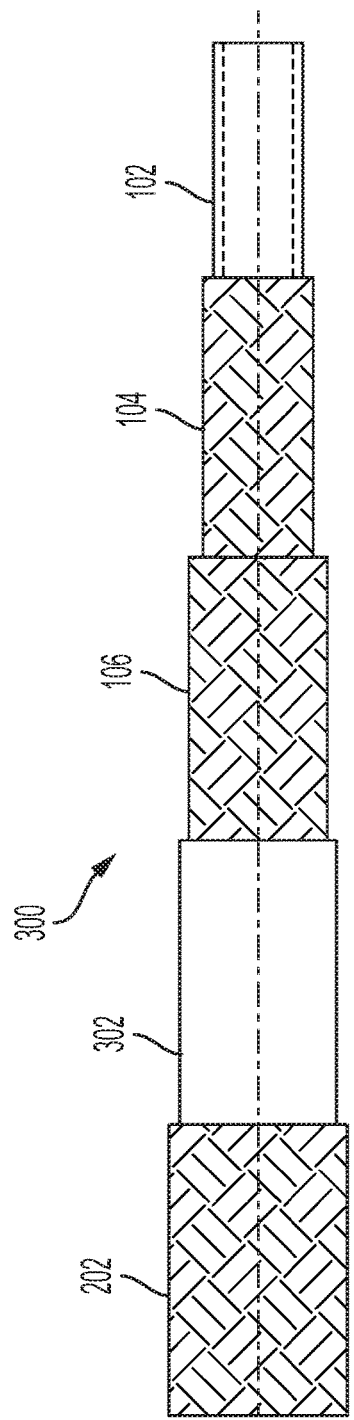
FIG. 5 illustrates a side-elevational view a hose having a fluid barrier layer, in accordance with an example implementation.
Figure 6:
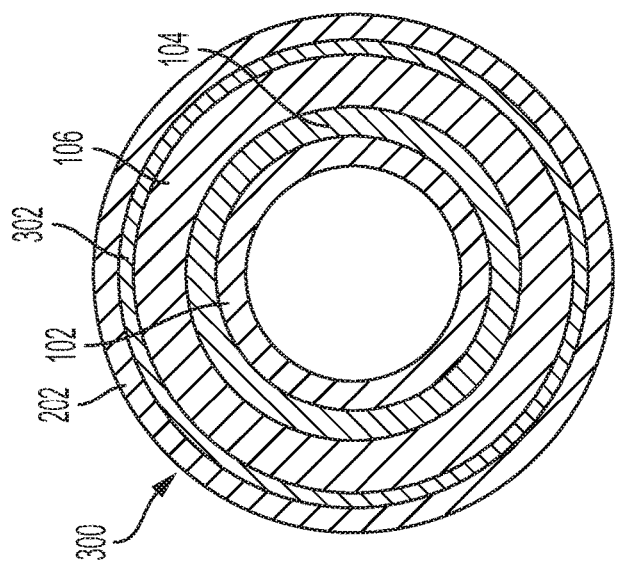
FIG. 6 illustrates a cross-sectional front view of the hose shown in FIG. 5, in accordance with an example implementation.

FIG. 5 illustrates a side-elevational view of a hose 300 having a fluid barrier layer 302, and FIG. 6 illustrates a cross-sectional front view of the hose 300, in accordance with an example implementation. FIGS. 5-6 are described together.

Similar to the hose 100, the hose 300 also includes the core tube 102, the reinforcement layer 104, and the thermal insulation layer 106 described above. Additionally, the hose 300 includes the fluid barrier layer 302 surrounding the thermal insulation layer 106 and interposed between the thermal insulation layer 106 and the cover layer 202.

The fluid barrier layer 302 can also be referred to herein as a chemical-resistant layer. As used herein, "chemical resistance" refers to the ability to resist swelling, crazing, stress cracking, corrosion, and/or mild acidic or alkaline solutions, phosphate-ester solutions, alcohols and other organic solvents and hydrocarbons, inorganic solvents (such as water or brine), and the like. As such, the fluid barrier layer 302 operates as a barrier to liquid, chemicals, and/or particulate matter. In examples, the fluid barrier layer 302 can also provide some degree of abrasion resistance for the hose 300.

In an example, the fluid barrier layer 302 can comprise a metal layer. Example metals that can be used for such metal layer can include aluminum, stainless steel, nickel, iron, or combinations of two or more thereof (including alloys). In another example, the fluid barrier layer 302 can be provided in the form of a metal foil wrapped or disposed about the thermal insulation layer 106.

The fluid barrier layer 302 can also be provided as a film layer deposited (e.g., such as by evaporating the metal) directly onto the thermal insulation layer 106 or onto another metal layer. In another example, the fluid barrier layer 302 can comprise a metalized coating deposited over the thermal insulation layer 106. An example metalized insulating material is available, for example, from ADL Insulflex, Inc.

In another example, the fluid barrier layer 302 can take the form of a polyimide material, e.g., a polyimide tape wrapped about the thermal insulation layer 106. An example polyimide material can be Kapton® sold by DuPont. The polyimide tape has the ability to maintain its physical, mechanical, and electrical properties over a wide temperature range and can withstand temperature of about 1000° F., for example. The fluid barrier layer 302 can have any desired thickness. In one example, the fluid barrier layer 302 can have a thickness of from about 0.002 to about 0.03 inches.

In examples, in addition to contributing to or providing the desired chemical resistance properties, the fluid barrier layer 302 can may also contribute to the heat resistance of the hose 300. For example, the fluid barrier layer 302 can include a metal layer having the effect of reflecting incoming radiation, such that the metal layer operates as a radiation protection layer that protects the underlying hose layers.

Hoses are used to transfer fluids (e.g., hydraulic fluid or fuel) from a source of fluid (e.g., a pump) to other components in a fluid system. As such, hoses can be fluidly coupled to other components such as valves and manifold. To facilitate fluidly coupling or connecting the hoses to other components (e.g., manifolds), the hoses described above can be coupled to a fitting on one end or both ends thereof, and such fittings can connect a hose to other components of the fluid system.

Figure 7:
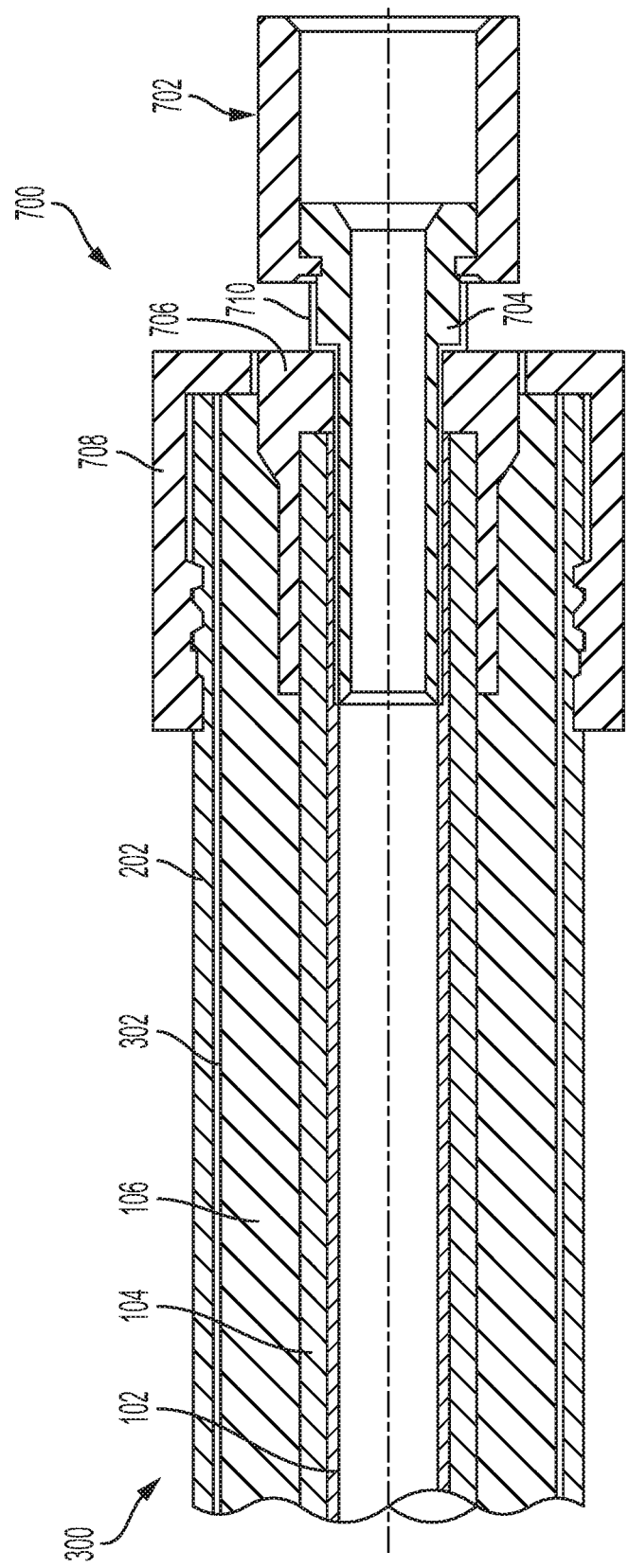
FIG. 7 illustrates a cross-sectional side view of a hose assembly, in accordance with an example implementation.

FIG. 7 illustrates a cross-sectional side view of a hose assembly 700, in accordance with an example implementation. The hose assembly 700 is depicted with layers of the hose 300. However, it should be understood that the assembly features described with respect to FIG. 7 can be implemented with the hose 100 or the hose 200.

The hose assembly 700 includes a hose fitting 702 coupled to an end of the hose 300. The hose fitting 702 can include a nipple 704 positioned partially within the core tube 102. The hose fitting 702 can also include a socket 706 disposed partially between the thermal insulation layer 106 and the reinforcement layer 104. The hose fitting 702 can further include a sleeve 708 crimped about an exterior peripheral surface of the cover layer 202 at an end of the hose 300.

Components of the hose fitting 702 can be made of a thermally-conductive material (e.g., steel), and can therefore provide a thermally-conductive path for the heat emitted by the hose 300 at the interface of the hose fitting 702 and the hose 300. A fire can produce a large amount of thermal energy that can subject the materials contacting the hose fitting 702 to damage. As such, in examples, the hose assembly 700 can further include a thermal coating 710 applied to at least a portion of an exterior surface of the nipple 704, partially between the exterior surface of the nipple 704 and the interior surface of the core tube 102.

With this configuration the thermal coating 710 can operate as a thermal insulator that may retard conduction of heat through the metal parts of the nipple 704 into the core tube 102, thereby protecting the interior of the core tube 102, which may further extend the life of the hose 300 in a fire environment. As an example, the thermal coating 710 can include a high-temperature protective coating such as CP 4010 provided by Aremco Products, Inc. of Valley Cottage, N.Y. under the trademark Con-Paint.

Other coatings such the CP30XX coatings can be used. CP30XX coatings are inorganic-ceramic, aqueous-based coatings that provide thermal and fire resistance. For example, such coatings can operate normally under sustained exposure to temperature range of about 1000-1200° F. and can also provide fire and temperature resistance for a short term exposure (e.g., 5-15 minutes) at a temperature of 2000° F.

Such protective coatings can be silicone-based, heat-resistant coatings that are VOC-compliant, water-dispersible silicone resin. The coatings can provide adherence to metals and provides thermal resistance to high temperatures when applied at a wet film thickness of five mils or a corresponding dry film thickness of 1.5 mils. However, thickness of the thermal coating 710 may be selected as desired for a particular application and/or a desired time to failure specification. In some examples, a thermal coating might not be used.

In examples where the core tube 102 is made of an electrically-conductive material, the nipple 704 can also provide an electrically-conductive path for the core tube 102 to bleed off static-dissipation or for electrical grounding.

Further, in some examples, the hoses 200, 300 having the cover layer 202 can be configured to protect the respective hose from swelling and breaking. Particularly, the cover layer 202 can be configured to be vented to prevent air or gas from being trapped underneath the cover layer 202.

Figure 8:
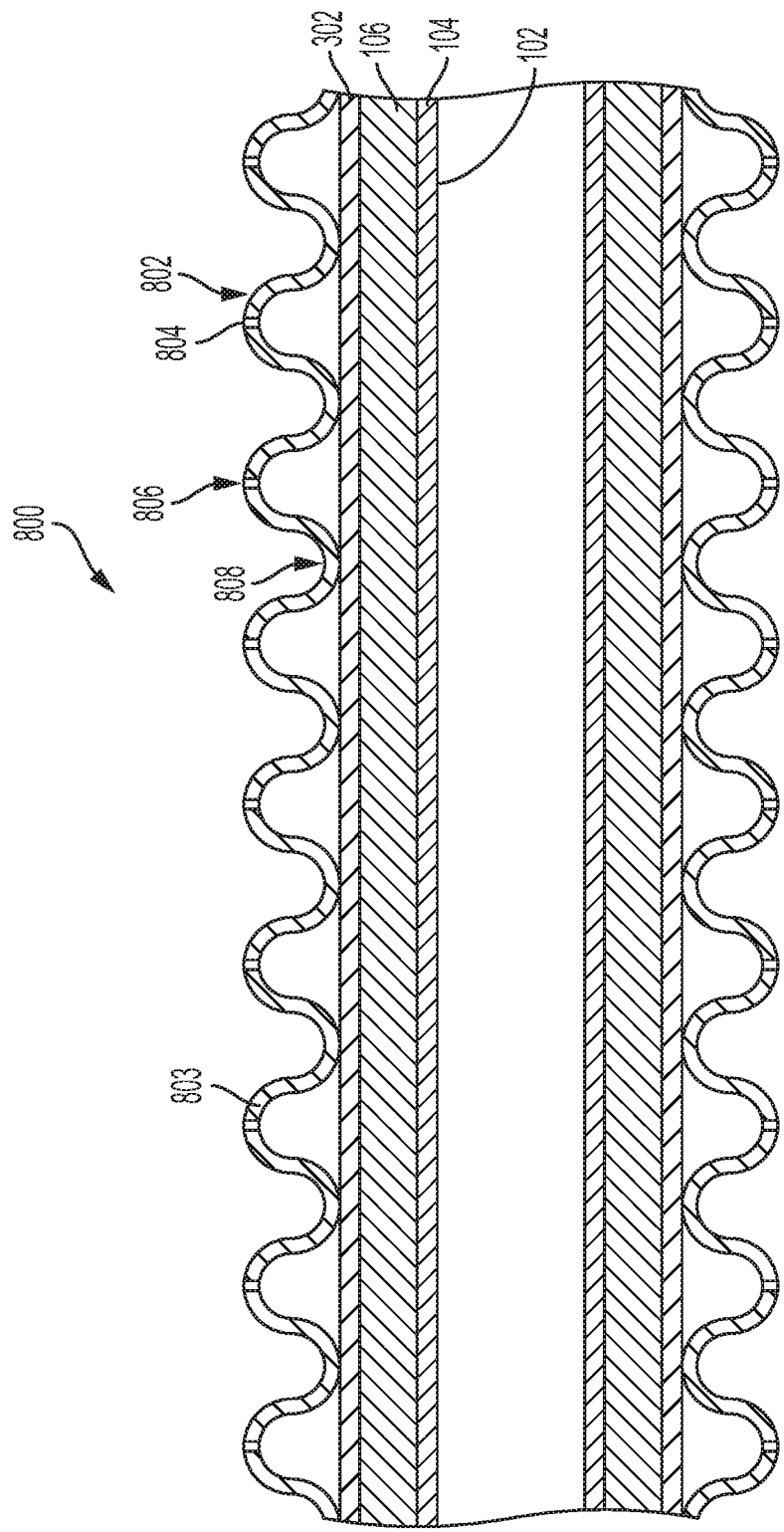
FIG. 8 illustrates a hose having a cover layer that is vented and comprising a corrugated tube, in accordance with an example implementation.

FIG. 8 illustrates a hose 800 having a cover layer 802 that is vented and comprising a corrugated tube 803, in accordance with an example implementation. The hose 800 is depicted in FIG. 8 as including the layers of the hose 300; however, the cover layer 802 can be used with the hose 200 as well.

In the configuration of FIG. 8, the cover layer 802 is configured as a vented jacket comprising vent holes, such as vent hole 804, disposed in a wall of the corrugated tube 803. In an example, the corrugated tube 803 can have rounded peaks 806 and rounded valleys 808. However, in other examples, the peaks and valleys may be shaped as desired and may have, for instance, square peaks and square valleys, rounded peaks and square valleys, square peaks and rounded valleys, combinations thereof, or other shapes as desired.

Further, the distance or spacing between adjacent peaks can be varied based on the application. The number and location of vent holes may also be selected as desired. As shown in FIG. 8, the vent holes (such as the vent hole 804) are located near the apex of the rounded peaks 806. The vent holes, however, can be located in another portion of the wall of the corrugated tube 803.

The vent holes may prevent air from being trapped underneath the cover layer 802. If air is trapped underneath the cover layer 802, it may balloon, swell, or break. Thus, providing a path for air to be released or vented can protect the cover layer 802 against effects of trapped air.

The hoses described above (e.g., the hoses 100, 200, 300, and 800) are configured to be fire-resistant and/or fireproof as defined by SAE AS1055 for the particular hose material. AS1055 classifies fire protection as fire resistant (Class A) where the hose withstands the designated fire test for 5 minutes without evidence of leakage, and as fireproof (Class B) where the hose withstands the designated fire test for a period of 15 minutes without evidence of leakage. Fire protection is also classified based on the composition of the core tube 102 (e.g., whether the core tube is rubber based or PTFE-based), hose function (e.g., fuel and lube oil or hydraulic fluid), and compatibility (e.g., synthetic fluid or petroleum based fluid). The flow conditions under which a hose may be considered fire resistant or fireproof may be selected as desired for a particular purpose or intended use.

For example, the amount of flow within the hose may affect the ability of a hose to withstand the flame in a fire test for a given period. Engines and other environments in which the hose may be used are being configured so that the fluid flow through the hose may be stopped during a fire. Using thermal insulation layers, and in some examples reinforcement layers, including basalt can render the hoses described herein fire-resistant or fireproof under zero flow conditions.

Figure 9:
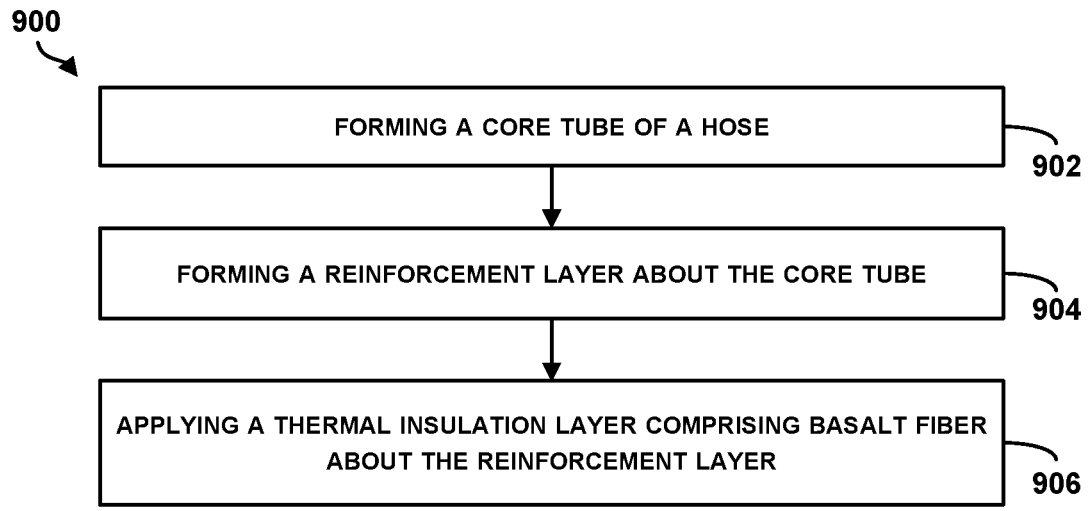
FIG. 9 is a flowchart of a method for making a hose, in accordance with an example implementation.

FIG. 9 is a flowchart of a method 900 for making a hose, in accordance with an example implementation. The method 900 can, for example, be used to make the hose 100, 200, 300, or 800.

The method 900 may include one or more operations, or actions as illustrated by one or more of blocks 902-906, 1000, and 1100. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 902, the method 900 includes forming the core tube 102 of a hose. For example, the core tube 102 of any of the hoses 100, 200, 300, or 800 can be made by extrusion and can be made of PTFE.

At block 904, the method 900 includes forming the reinforcement layer 104 about the core tube 102. The reinforcement layer 104 can comprise a metal wire such as CRES, and can be formed as a braid of alternating interwoven wires. In another example, the reinforcement layer 104 can comprise basalt fiber and/or carbon fiber.

At block 906, the method 900 includes applying the thermal insulation layer 106 comprising basalt fiber about the reinforcement layer. For example, the thermal insulation layer 106 can comprises basalt fiber and/or carbon fiber as described above.

Figure 10:
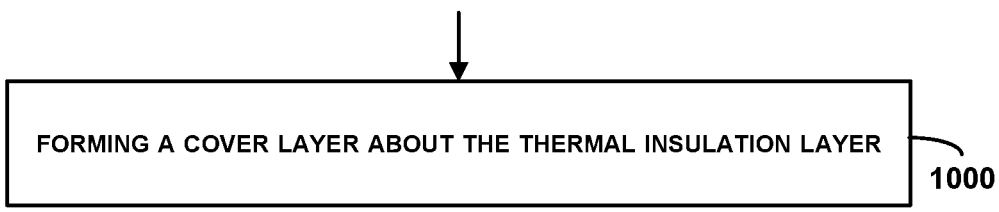
FIG. 10 is a flowchart of an additional operation that may be performed with the method of FIG. 9, in accordance with an example implementation.

FIG. 10 is a flowchart of an additional operation that may be performed with the method of FIG. 9, in accordance with an example implementation. At block 1000, operations include forming a cover layer (e.g., the cover layer 202 or the cover layer 802) about the thermal insulation layer 106 (see FIGS. 3-4).

Figure 11:
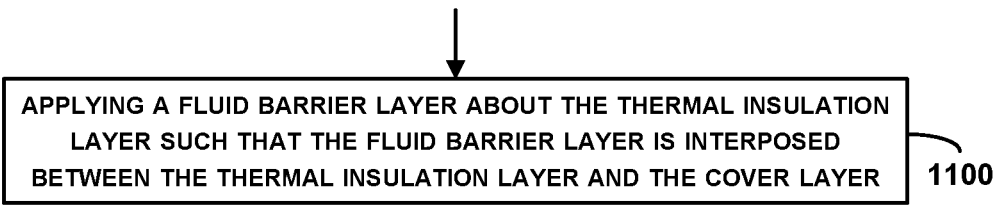
FIG. 11 is a flowchart of an additional operation that may be performed with the method of FIG. 9, in accordance with an example implementation.

FIG. 11 is a flowchart of an additional operation that may be performed with the method of FIG. 9, in accordance with an example implementation. At block 1100, operations include applying the fluid barrier layer 302 about the thermal insulation layer 106 such that the fluid barrier layer 302 is interposed between the thermal insulation layer 106 and the cover layer (see FIGS. 5-6).

The method 900 can include other steps based on desired configuration of the hose. For example, other method steps can include mounting the hose fitting 702 to the hose to facilitate fluidly coupling the hose to another component such as a valve or a manifold.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A hose comprising:
   a core tube having a smooth bore and a smooth outer surface;
   a reinforcement layer directly interfacing with and surrounding the smooth outer surface of the core tube, wherein the reinforcement layer provides structural support to the core tube, and wherein the reinforcement layer comprises basalt fiber; and
   a thermal insulation layer directly interfacing with and surrounding the reinforcement layer, wherein the thermal insulation layer comprises basalt fiber.

2. The hose of claim 1, wherein the core tube comprises Polytetrafluoroethylene (PTFE).

3. The hose of claim 1, wherein the thermal insulation layer comprises a plurality of layers, wherein a first subset of the plurality of layers comprise basalt fiber, and wherein a second subset of the plurality of layers comprise carbon fiber.

4. The hose of claim 1, wherein the reinforcement layer further comprises carbon fiber.

5. The hose of claim 1, further comprising:
   a cover layer surrounding the thermal insulation layer such that the cover layer is an outermost layer of the hose.

6. The hose of claim 5, further comprising:
   a fluid barrier layer surrounding the thermal insulation layer and interposed between the thermal insulation layer and the cover layer.

7. The hose of claim 6, wherein the fluid barrier layer comprises a polyimide material.

8. The hose of claim 5, wherein the cover layer comprises a corrosion resistant stainless steel (CRES) or nickel alloy wire braid having interstices therein.

9. The hose of claim 5, wherein the cover layer comprises a corrugated tube having at least one vent hole disposed through a wall thereof.

10. The hose of claim 1, wherein the thermal insulation layer is non-ablative when the hose is subjected to a fire at 2000° F. for a period of 15 minutes.

11. The hose of claim 1, wherein the thermal insulation layer comprising basalt fiber comprises a braid of alternating interwoven fibers.

12. A hose assembly comprising:
    a core tube having a smooth bore and a smooth outer surface;
    a reinforcement layer directly interfacing with and surrounding the smooth outer surface of the core tube, wherein the reinforcement layer provides structural support to the core tube, and wherein the reinforcement layer comprises basalt fiber;
    a thermal insulation layer directly interfacing with and surrounding the reinforcement layer, wherein the thermal insulation layer comprises basalt fiber and/or carbon fiber;
    a fluid barrier layer surrounding the thermal insulation layer;
    a cover layer surrounding the fluid barrier layer; and
    a hose fitting coupled to an end of the core tube, wherein the hose fitting comprises: (i) a nipple positioned partially within the core tube, and (ii) a sleeve disposed about an exterior peripheral surface of the cover layer.

13. The hose assembly of claim 12, wherein the hose fitting further comprises:
    a socket disposed partially between the thermal insulation layer and the reinforcement layer.

14. The hose assembly of claim 12, wherein the hose fitting further comprises:
    a thermal coating applied to an exterior surface of the nipple.

15. The hose assembly of claim 12, wherein the thermal insulation layer comprises a plurality of layers, wherein a first subset of the plurality of layers comprise basalt fiber, and wherein a second subset of the plurality of layers comprise carbon fiber.

16. The hose assembly of claim 12, wherein the reinforcement layer further comprises carbon fiber.

17. The hose assembly of claim 12, wherein the thermal insulation layer comprises a braid of alternating interwoven fibers.

18. A method comprising:
    forming a core tube of a hose, wherein the core tube has a smooth bore and a smooth outer surface;
    forming a reinforcement layer directly interfacing with and surrounding the smooth outer surface of the core tube, wherein the reinforcement layer provides structural support to the core tube, and wherein the reinforcement layer comprises basalt fiber; and
    applying a thermal insulation layer comprising basalt fiber directly to the reinforcement layer.

19. The method of claim 18, further comprising:
    forming a cover layer about the thermal insulation layer.

20. The method of claim 19, further comprising:
    applying a fluid barrier layer about the thermal insulation layer such that the fluid barrier layer is interposed between the thermal insulation layer and the cover layer.

* * * * *